United States Patent
Sodagar

(10) Patent No.: US 11,889,506 B2
(45) Date of Patent: Jan. 30, 2024

(54) METHOD AND APPARATUS FOR CONFIGURING 5G APPLICATION SERVERS IN CONNECTED UPLINK-TO-DOWNLINK STREAMING

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 309 days.

(21) Appl. No.: 17/497,027

(22) Filed: Oct. 8, 2021

(65) Prior Publication Data

US 2022/0322323 A1 Oct. 6, 2022

Related U.S. Application Data

(60) Provisional application No. 63/168,962, filed on Mar. 31, 2021.

(51) Int. Cl.
| | | |
|---|---|---|
| *H04W 72/04* | (2023.01) | |
| *H04W 72/20* | (2023.01) | |
| *H04L 67/141* | (2022.01) | |

(52) U.S. Cl.
CPC .......... *H04W 72/20* (2023.01); *H04L 67/141* (2013.01)

(58) Field of Classification Search
CPC ............. H04L 12/1407; H04L 65/1069; H04L 67/141; H04L 65/612; H04L 65/1063; H04L 2101/385; H04W 72/20
See application file for complete search history.

(56) References Cited

U.S. PATENT DOCUMENTS

| | | |
|---|---|---|
| 2013/0290493 A1 | 10/2013 | Oyman et al. |
| 2016/0357422 A1 | 12/2016 | Milden et al. |
| 2023/0246915 A1* | 8/2023 | Lohmar .............. H04L 12/1407 709/223 |

OTHER PUBLICATIONS

ETSI TS 126 512 V16.1.0 (Jan. 2021), "5G; 5G Media Streaming (5GMS); Protocols (3GPP TS 26.512 version 16.1.0 Release 16)", ETSI published in Jan. 2021, pp. 1-98 (99 pages total).
International Search Report and Written Opinion of the International Searching Authority dated Feb. 8, 2022 in Application No. PCT/US 21/54566.

(Continued)

*Primary Examiner* — Vinncelas Louis
(74) *Attorney, Agent, or Firm* — Sughrue Mion, PLLC

(57) ABSTRACT

A method, device, and non-transitory computer-readable storage medium are provided. The method includes transmitting, with a $5^{th}$ generation media streaming (5GMS) application provider to a 5GMS downlink application function (AF), a first request to create a first content hosting configuration template, receiving, at the 5GMS application provider from the 5GMS downlink AF, the first content hosting configuration template, transmitting, with the 5GMS application provider to a 5GMS uplink AF, a second request to create a second content hosting configuration template, the second request including protocol information, and receiving, at the 5GMS application provider from the 5GMS uplink AF, an acknowledgement that the second content hosting configuration template is created.

20 Claims, 8 Drawing Sheets

(56) References Cited

OTHER PUBLICATIONS

"3rd Generation Partnership Project; Technical Specification Group Services and System Aspects; 5G Media Streaming (6GMS); Protocols (Release 16)", 3GPP TS 26.512 V16.1.0, Dec. 2020, 96pages.
"3rd Generation Partnership Project; Technical Specification Group Services and System Aspects; 5G Media Streaming (5GMS); General description and architecture (Release 16)", 3GPP TS 26.501 V16.6.1, Jan. 2021, 79pages.
Extended European Search Report dated Jul. 10, 2023 in European Application No. 21928362.9.
Tencent, "[FS_5GMS-EXT] Updated text for Content Preparation", F3GPP TSG SA WG4 MBS SWG post 112-e, S4al201154, 2021 (15 pages total).

* cited by examiner

METHOD AND APPARATUS FOR CONFIGURING 5G APPLICATION SERVERS IN CONNECTED UPLINK-TO-DOWNLINK STREAMING

CROSS-REFERENCE TO RELATED APPLICATION

This application claims priority from U.S. Provisional Application No. 63/168,962, filed on Mar. 31, 2021, in the United States Patent and Trademark Office, the disclosure of which is incorporated herein by reference in its entirety.

FIELD

The disclosure generally relates to $5^{th}$ generation (5G) media streaming (5GMS), and, in particular, to a method and apparatus for setting up connections between 5GMS application servers for uplink and downlink streaming.

BACKGROUND

The 3rd Generation Partnership Project (3GPP) TS26.512 defines the concept of uplink streaming where the content is streamed from a device to an external service provider. However, existing streaming architecture does not provide or define how to set up a session that streams content from one user to other users by connecting uplink and downlink streaming.

SUMMARY

In accordance with an aspect of the disclosure, a method may include transmitting, with a $5^{th}$ generation media streaming (5GMS) application provider to a 5GMS downlink application function (AF), a first request to create a first content hosting configuration template, receiving, at the 5GMS application provider from the 5GMS downlink AF, the first content hosting configuration template, transmitting, with the 5GMS application provider to a 5GMS uplink AF, a second request to create a second content hosting configuration template, the second request including protocol information, and receiving, at the 5GMS application provider from the 5GMS uplink AF, an acknowledgement that the second content hosting configuration template is created.

In accordance with an aspect of the disclosure, a device may include at least one memory configured to store program code, and at least one processor configured to read the program code and operate as instructed by the program code, the program code including first transmitting code configured to cause the at least one processor to transmit, with a 5GMS application provider to a 5GMS downlink AF, a first request to create a first content hosting configuration template, first receiving code configured to cause the at least one processor to receive, at the 5GMS application provider from the 5GMS downlink AF, the first content hosting configuration template, second transmitting code configured to cause the at least one processor to transmit, with the 5GMS application provider to a 5GMS uplink AF, a second request to create a second content hosting configuration template, the second request including protocol information, and second receiving code configured to cause the at least one processor to receive, at the 5GMS application provider from the 5GMS uplink AF, an acknowledgement that the second content hosting configuration template is created.

In accordance with an aspect of the disclosure, a non-transitory computer-readable medium may store instructions that include one or more instructions that, when executed by one or more processors of a device, cause the one or more processors to transmit, with a 5GMS application provider to a 5GMS downlink AF, a first request to create a first content hosting configuration template, receive, at the 5GMS application provider from the 5GMS downlink AF, the first content hosting configuration template, transmit, with the 5GMS application provider to a 5GMS uplink AF, a second request to create a second content hosting configuration template, the second request including protocol information, and receive, at the 5GMS application provider from the 5GMS uplink AF, an acknowledgement that the second content hosting configuration template is created.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
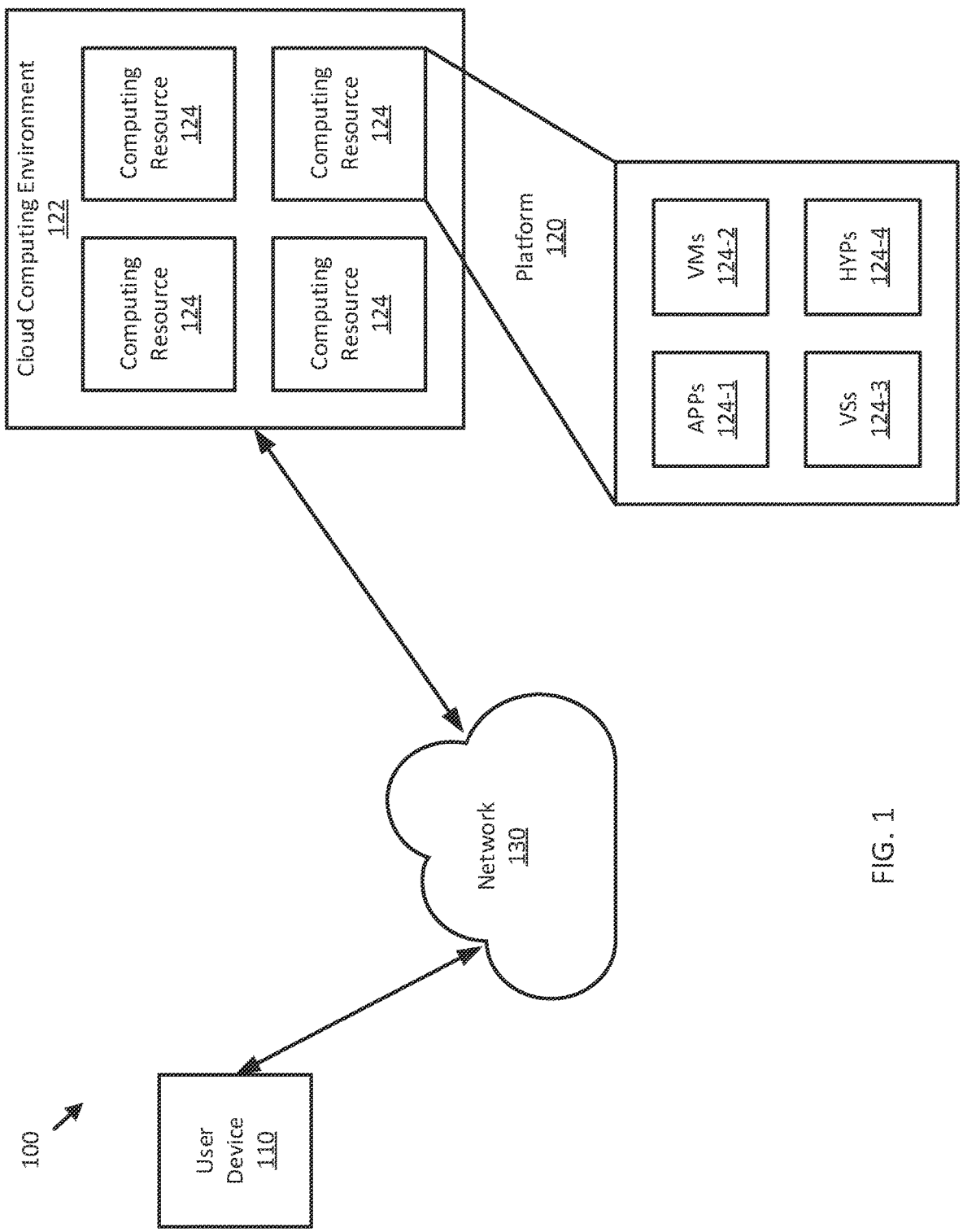
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
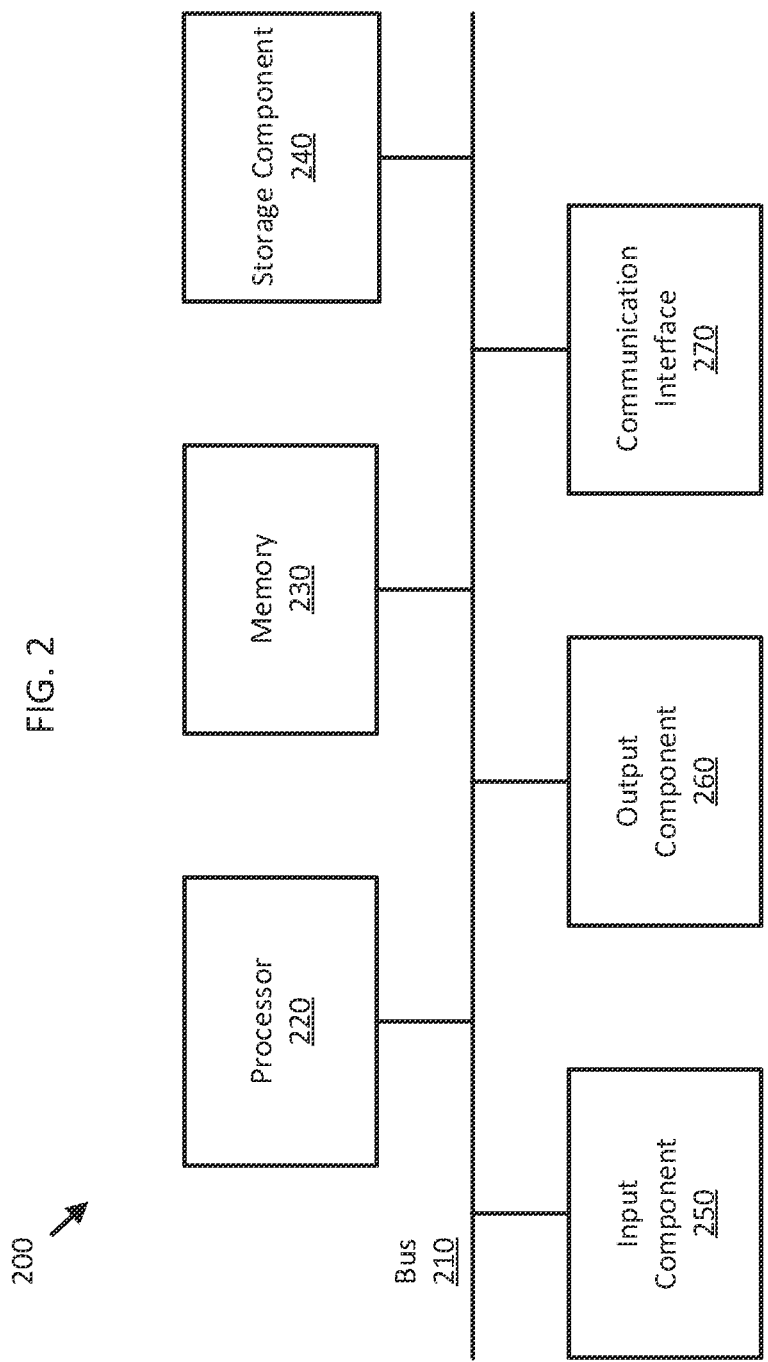
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
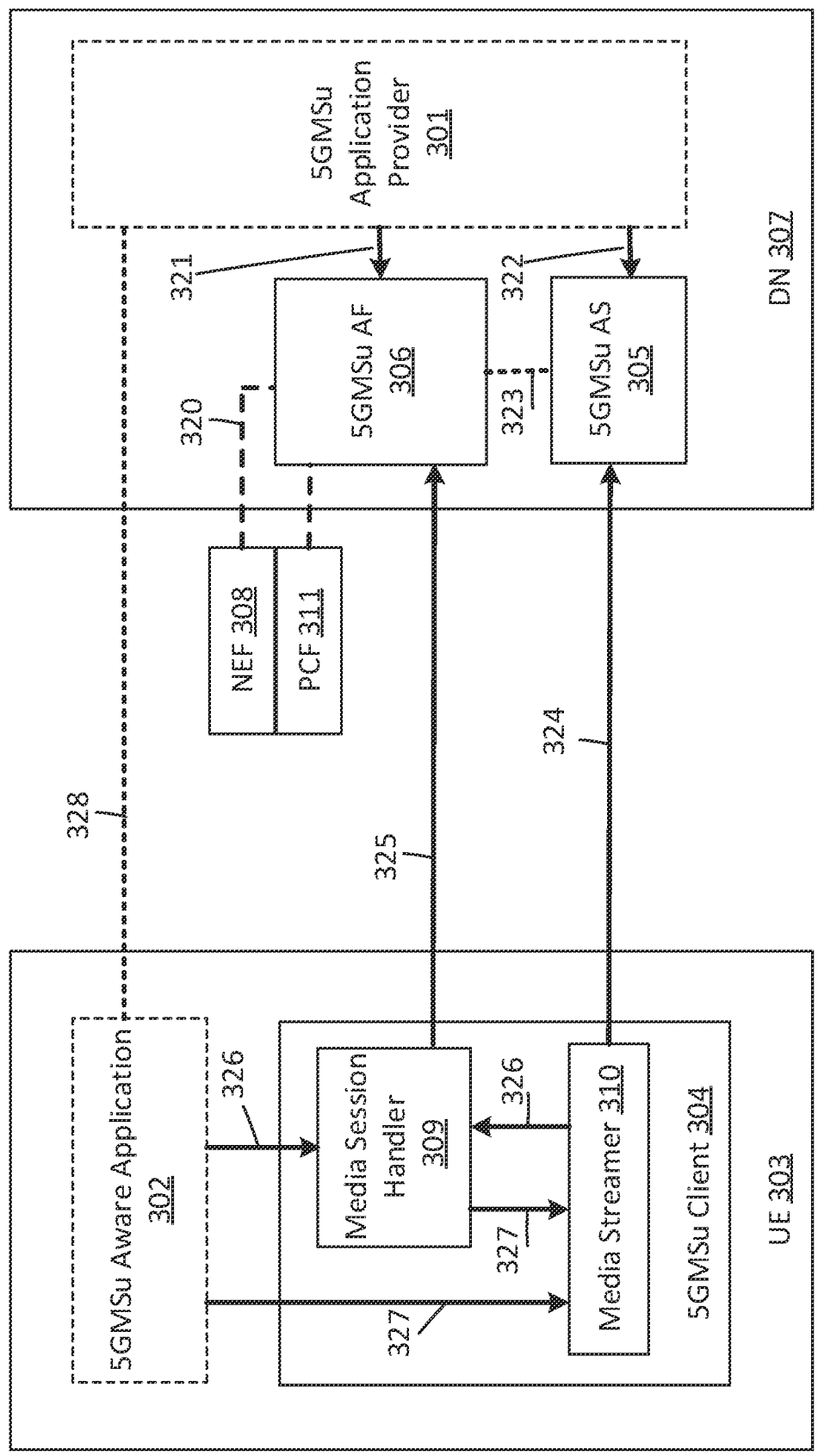
FIG. 3 is a diagram of a media architecture for media uplink streaming, according to embodiments.

FIG. 3 is a diagram of a media architecture 300 for media uplink streaming according to embodiments. A 5GMSu Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu AS may be an AS dedicated to 5G Media Uplink Streaming. 5GMSu Client 304 may be a UE 303 internal function dedicated to 5G Media Uplink Streaming.

5GMSu AF 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions and may be implemented as a content delivery network (CDN), for example. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different PCF 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

Figure 4:
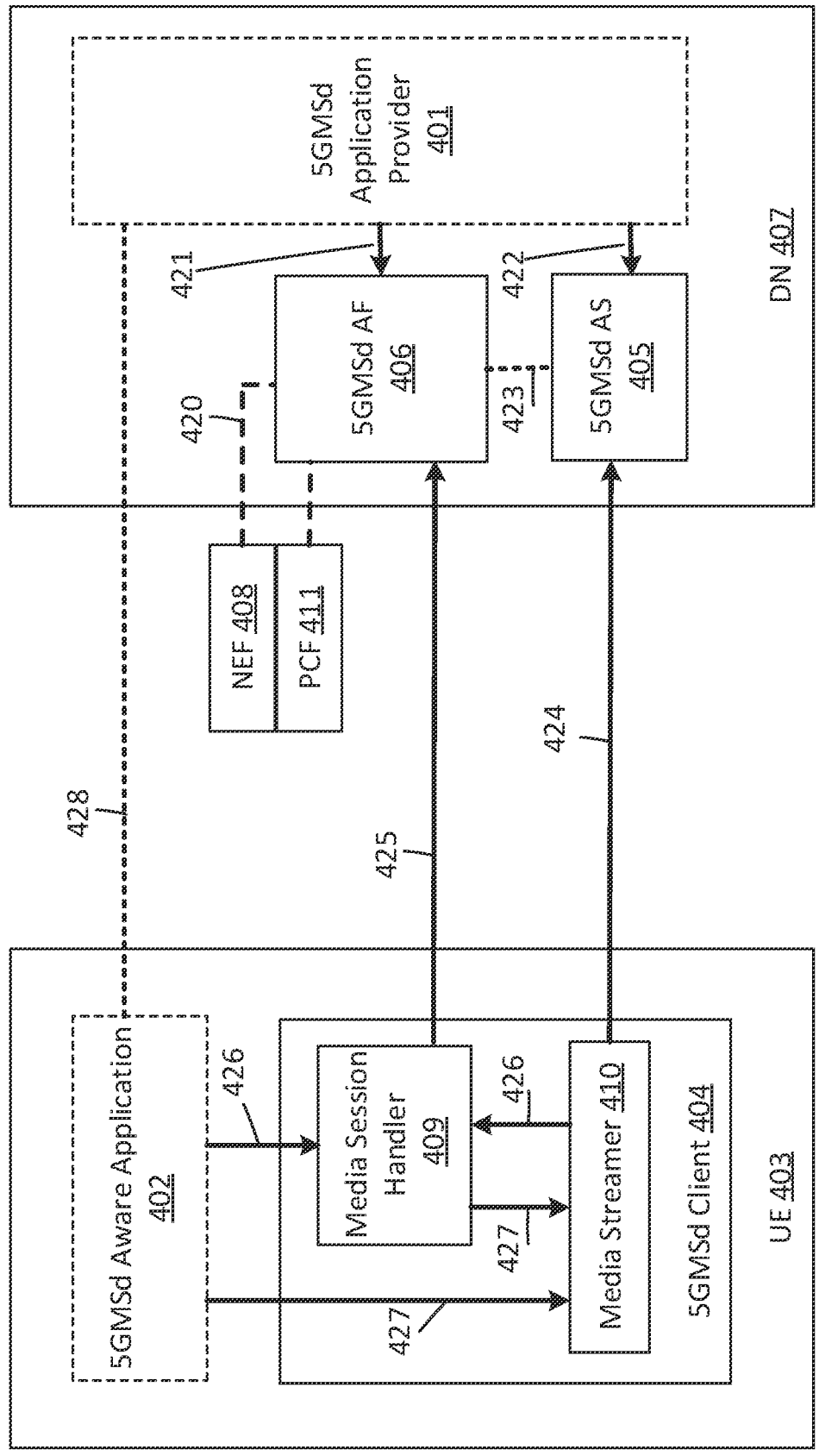
FIG. 4 is a diagram of a media architecture for media downlink streaming, according to embodiments.

FIG. 4 is a diagram of a media architecture 400 for media downlink streaming, according to embodiments. A 5GMSd Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd AS may be an AS dedicated to 5G Media Downlink Streaming. 5GMSd Client 404 may be a UE 403 internal function dedicated to 5G Media Downlink Streaming.

5GMSd AF 406 and 5GMSd AS 405 may be DN 407 functions. Functions in trusted DNs may be trusted by the operator's network. Therefore, AFs in trusted DNs may directly communicate with all 5G Core functions. Functions in external DNs may only communicate with 5G Core functions via the NEF 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 404 by implementing external application or content service provider specific logic and enabling the establishment of a media session. 5GMSd AS 405 may host 5G media functions. 5GMSd Application Provide 401 may be an external application or content specific media functionality. e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different PCF 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Figure 5:
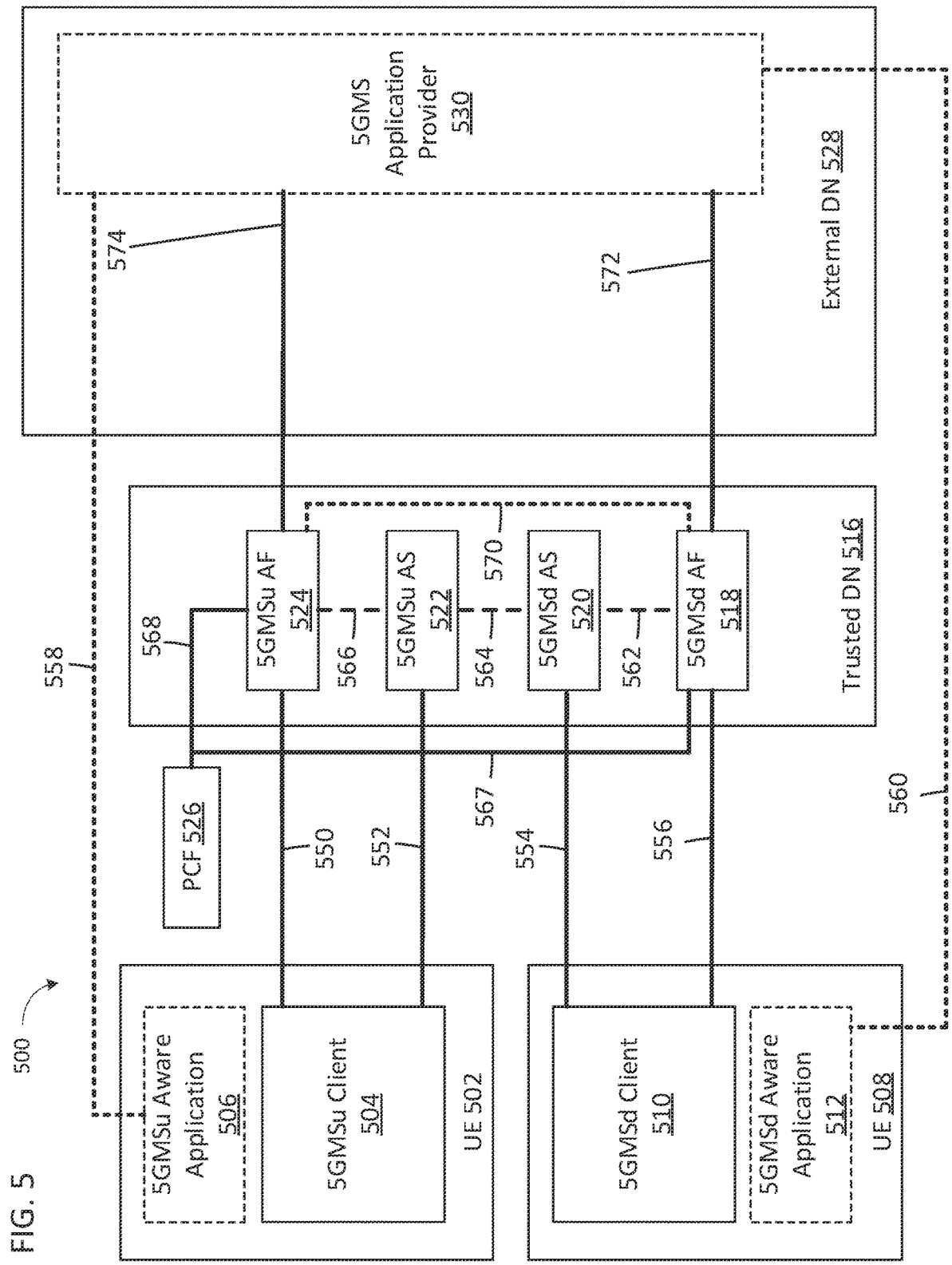
FIG. 5 is a diagram of a media system for uplink to downlink streaming, according to embodiments.

FIG. 5 is a diagram of a media system 500 for uplink to downlink streaming, according to embodiments. The system 500 includes a first UE 502, a second UE 508, a trusted DN 516 and an external DN 528. The first UE 502 includes a 5GMSu client 504 and a 5GMSu Aware Application 506. The second UE 508 includes a 5GMSd client 510 and a 5GMSd Aware Application 512. The trusted DN 516 includes a 5GMSd AF 518, a 5GMSd 520, a 5GMSu 522 and a 5GMSu AF 524. The external DN 528 includes a 5GMS Application Provider 530.

The 5GMSu client 504 is connected to the 5GMSu AF 524 by an M5u interface 550 and is connected to the 5GMSu AS 522 by an M4u interface 522. The 5GMSu Aware Application 506 is connected with the 5GMS Application Provider 530 by an M8u interface 558. The 5GMSd client 510 is connected to the 5GMSd AS 520 by an M4d interface 554 and is connected with the 5GMSd AF 518 by an M5d interface 556. The 5GMSd Aware Application 512 is connected to the 5GMS Application Provider 530 by an M8d interface 560.

The 5GMSd AF 518 is connected with the 5GMSd AS 520 by an M3d interface 562, to the 5GMSu AF 524 by an I1 interface 570, to the PCF 526 by an N5 interface 567 and to the 5GMS Application Provider 530 by an M1d interface 572. The 5GMSd AS 520 is connected to the 5GMSu AS 522 by an I2 interface 564. The 5GMSu AS 522 is connected to the 5GMSu AF 524 by an M3u interface 566. The 5GMSu AF 524 is connected with the PCF 526 by an N5 interface 568, and to the 5GMS Application Provider 530 by an M1u interface 574. The 5GMS Application Provider 530 may set up a session for streaming content from one user to other users by connecting the uplink and downlink streaming as shown in FIG. 5.

Figure 6:
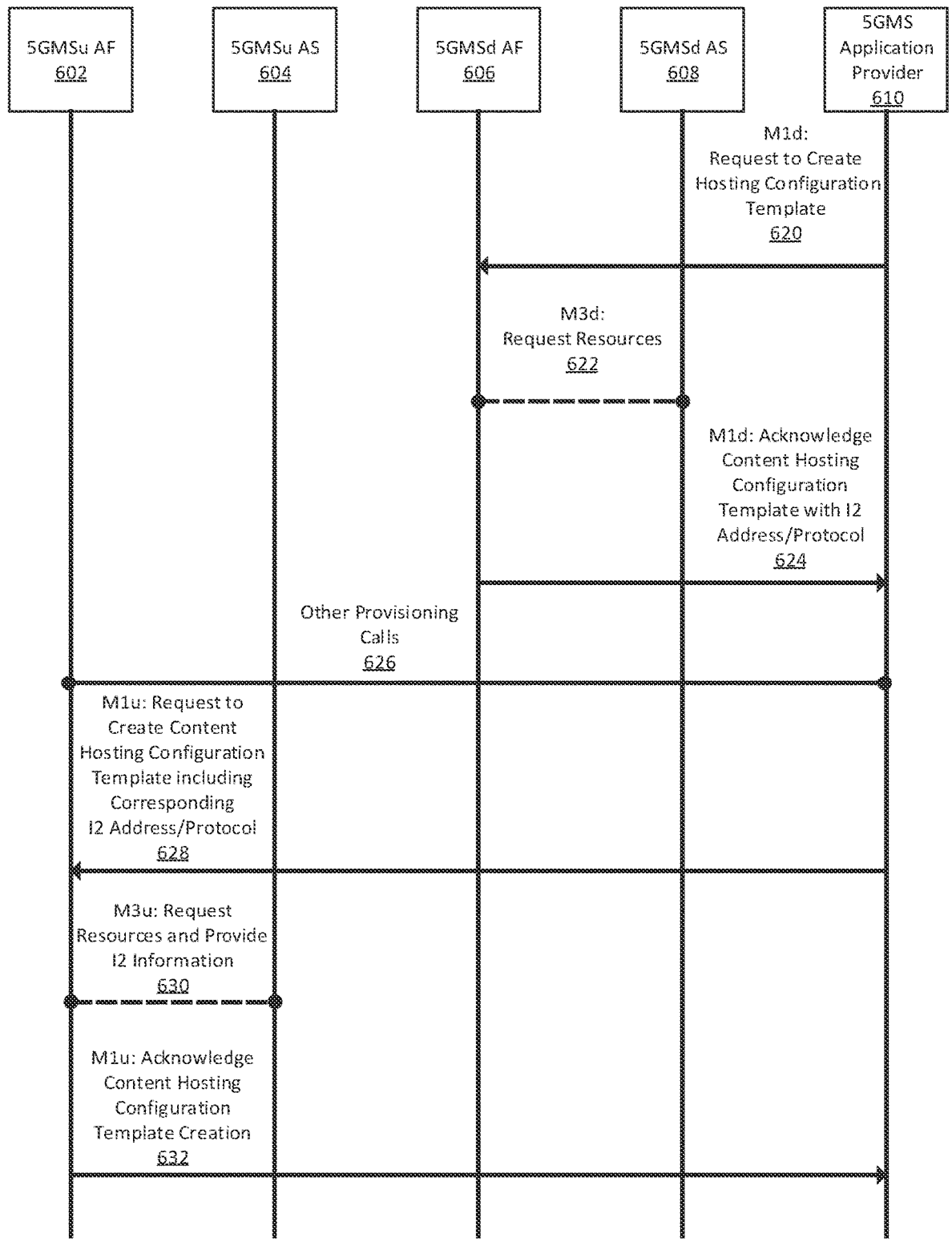
FIG. 6 is a diagram of an operation flow for uplink and downlink streaming in a 5G network, according to embodiments

FIG. 6 is a diagram of an operation flow for uplink and downlink streaming in a 5G network, according to embodiments. The operation flow utilizes, for example, a 5GMSu AF 602, a 5GMSu AS 604, a 5GMSd AF 606, a 5GMSd AS 608, and a 5GMS Application Provider 610.

In operation 620, the 5GMS Application Provider 610 transmits a request to create a hosting configuration template to the 5GMSd AF 606, using, for example, interface M1d. The request may include a request for the I2 address and supported protocols.

In operation 622, the 5GMSd AF 606 requests resources from the 5GMSd AS 608 using, for example, interface M3d.

In operation 624, the 5GMS Application Provider 610 receives an acknowledgement including the content hosting configuration template that is transmitted from the 5GMSd AF 606. The content hosting configuration template may include relevant information regarding the I2 address and protocols in the ingest configuration field of the content hosting configuration template.

In operation 626, other provisioning calls may be performed.

In operation 628, the 5GMS Application Provider 610 transmits to the 5GMSu AF 602 a request to create a second content hosting configuration template, the request including I2 address and supported protocols, using, for example, the M1u interface. The I2 address and the supported protocols may be included in the downlink ingest configuration field.

In operation 630, the 5GMSu AF 602 requests resources from and provides I2 information to the 5GMSu AS 604 using, for example, the M3u interface.

In operation 632, the 5GMS Application Provider 610 receives an acknowledgement transmitted by the 5GMSu AF 602 that the content hosting configuration template is created.

As shown in FIG. 6, the downlink content hosting configuration table is created in operations 620, 622 and 624, and the uplink content hosting configuration table is created in operations 628, 630 and 632. The order of the operations may be interchanged based on a connection requirement. For example, operations 628, 630 and 632 may be performed first and operations 620, 622 and 624 may be performed second.

In the disclosed methods of connecting a 5GMSu AS to a 5GMSd AS as virtual application providers, the 5GMSu AS may be considered an application provider for the 5GMSd AS, and vice versa. Therefore, the address of the AS's and the protocol between the two AS's may be exchanged through the application provider.

In a first example, a pull is performed by the 5GMSd AS 608 from the 5GMSu AS 604. In this example, operations 628, 630 and 632 may be performed first in which the Application Provider 610 request no protocol information. Instead, the 5GMS Application Provider 610 requests a uniform resource locator (URL) address of the 5GMSu AS 604 from which the content is to be pulled. Then, operations 620, 622 and 624 are performed in which the 5GMS Application Provider 610 requests the 5GMSd AS 608 with a protocol to pull the content from the 5GMSu AS 604 using the URL address.

In a second example, a push is performed by the 5GMSu AS 604 to the 5GMSd AS 608. In this example, operations 620, 622 and 624 may be performed first in which the Application Provider 610 request no protocol information. Instead, the 5GMS Application Provider 610 requests a URL address of the 5GMSd AS 608 to which the content is to be pushed. Then, operations 628, 630 and 632 are performed in which the 5GMS Application Provider 610 requests the 5GMSd AS 608 with a protocol to push the content from the 5GMSu AS 604 using the URL address.

Table 1 provides examples uses of the IngestConfiguration fields without protocol information.

TABLE 1

| Property name | Data Type | Cardinality | Description |
| --- | --- | --- | --- |
| IngestConfiguration | Object | 1 . . . 1 | Describes the 5GMSd Application Provider's origin server from which media resources will be ingested via interface M2d. |
| path | String | 1 . . . 1 | The relative path which may be used to address the media resources at interface M2d. This path is provided by the 5GMSd AF in the case of Push-based ingest. If the content is pulled from 5GMSd AS, this value is ignored. |
| pull | Boolean | 1 . . . 1 | Indicates whether to the 5GMSd AS may use Pull or Push for ingesting the content. |
| protocol | URI String | 0 . . . 1 | A fully-qualified term identifier allocated in the name space urn: 3gpp:5gms:content-protocol that identifies the content ingest protocol. In the case that the 5GMSd AS is requested not to use any protocols, this field should not be present. If this value is not present, then the value of pull should be set to True. |
| entryPoint | String | 1 . . . 1 | An entry point to ingest the content. The semantics of the entry point are dependent on the selected ingest protocol. In the case of Push ingest (pull flag is set to False), this parameter is returned by the 5GMSd AF to the 5GMSd Application Provider and indicates the entry point for pushing the content. In case of Pull (pull flag is set to True) and when a protocol is present, the entryPoint may be provided to the 5GMSd AF to indicate the location from which content is to be pulled. In this case, the entryPoint may be used as the base URL. A request received by the 5GMSd AS is mapped to a URL using the provided base URL to fetch the content from the origin server. In case of Pull (pull flag is set to True) and when any protocol is not present, the entryPoint may be provided by the 5GMSd AF to indicate the location from which the content is to be pulled. |

Table 2 provides examples uses of the EgestConfiguration fields without protocol information.

TABLE 2

| Property name | Data Type | Cardinality | Description |
| --- | --- | --- | --- |
| EgestConfiguration | Object | 1 . . . 1 | Describes the 5GMSu Application Provider's origin server from which media resources will be ingested via interface M2u. |
| path | String | 1 . . . 1 | The relative path which will be used to address the media resources at interface M2u. This path is provided to the 5GMSu AF in the case of Push-based egest. If the content is pulled from 5GMSu AS (pull is set to True), this value is ignored. |

TABLE 2-continued

| Property name | Data Type | Cardinality | Description |
|---|---|---|---|
| pull | Boolean | 1 . . . 1 | Indicates whether to the 5GMSu AS may use Pull or Push for egesting the content. |
| protocol | URI String | 0 . . . 1 | A fully-qualified term identifier allocated in the name space urn: 3gpp:5gms:content-protocol that identifies the content ingest protocol. In the case that the 5GMSu AS is requested not to use any protocols, this field should not be present. If this value is not present, then the value of pull should be set to True. |
| entryPoint | String | 1 . . . 1 | An entry point to egest the content. The semantics of the entry point is dependent on the selected ingest protocol. In the case of Pull ingest (pull flag is set to True), this parameter is provided to the 5GMSu AF to the 5GMSu Application Provider and indicates the entry point for pushing the content. In case of Push (pull flag is set to False) and when a protocol is present, the entryPoint may be provided to the 5GMSdu AF to indicate the location from which content is to be pushed. In this case, the entryPoint may be used as the base URL. In case of Pull (pull flag is set to True) and when any protocol is not present, the entryPoint may be provided by the 5GMSu AF to indicate the location from which the content is to be pulled. |

The AS URL addressed may be exposed to the Application Provider. Therefore, the URL address may be encrypted before providing it to the Application Provider. Then, the 5GMSu AS and the 5GMSd AS may have a mechanism to exchange the decryption key. Furthermore, a unique identifier may be provided to the Application Provider instead of the URL address. Then, the 5GMSu AS and the 5GMSd AS may recognize or have a method for finding the internal addresses of an AS from the unique identifier.

There may also be a lack of flexibility of using a 5G network proprietary protocol. To signal a 5G network proprietary signaling, a uniform resource identifier (URI) string may be used which is unique to the specific protocol used by 5G networks and only the trusted network entities, such as the 5GMS AS's, would be able to detect it. Since the protocol might need additional configuration parameters, a resource URL may be provided which describes the configuration parameters specific to the protocol.

Table 3 shows additional example uses of the IngestConfiguration field.

TABLE 3

| Property name | Data Type | Cardinality | Description |
|---|---|---|---|
| IngestConfiguration | Object | 1 . . . 1 | Describes the 5GMSd Application Provider's origin server from which media resources will be ingested via interface M2d. |
| path | String | 1 . . . 1 | The relative path which will be used to address the media resources at interface M2d. This path is provided by the 5GMSd AF in the case of Push-based ingest. If the content is pulled from 5GMSd AS, this value is ignored. |
| pull | Boolean | 1 . . . 1 | Indicates whether the 5GMSd AS may use Pull or Push for ingesting the content. |
| protocol | URI String | 0 . . . 1 | A fully-qualified term identifier allocated in the namespace urn: 3gpp:5gms:content-protocol that identifies the content ingest protocol. |

TABLE 3-continued

| Property name | Data Type | Cardinality | Description |
|---|---|---|---|
| protocol | URI String | 1 . . . 1 | In the case that the 5GMSd AS is requested not to use any protocols, this field should not be present. If this value is not present, then the value of pull should be set to True. A fully-qualified term identifier allocated in the namespace urn: 3gpp:5gms:content-protocol that identifies the content ingest protocol. In the case of using 5G interconnect, the URI is defined by the vendor. The URI may be outside of the namespace urn: 3gpp. |
| protocolConfiguration | URL String | 0 . . . 1 | A URL for the protocol configuration description. The format is defined by the protocol owner. This parameter is used only if the protocol is set to a value outside of the namespace urn: 3gpp. |
| entryPoint | String | 0 . . . 1 | An entry point to ingest the content. The semantics of the entry point id dependent on the selected ingest protocol. In the case of Push ingest (pull flag is set to False), this parameter is returned by the 5GMSd AF to the 5GMSd Application Provider and indicates the entry point for pushing the content. In case of Pull (pull flag is set to True), and when a protocol is present, the entryPoint may be provided to the 5GMSd AF to indicate the location from which content is to be pulled. In this case, the entryPoint may be used as the base URL. A request received by the 5GMSd AS is mapped to a URL using the provided base URL to fetch the content from the origin server. In case of Pull (pull flag is set to True) and when any protocol is not present, the entryPoint may be provided by the 5GMSd AF to indicate the location from which the content is to be pulled |
| entryPointId | String | 0 . . . 1 | An entry point identifier to ingest the content. The recipient of this value may map this to the location of the entry point. This value is protocol-dependent. In the case entryPointURI exists, this field may be ignored. In the case of Push ingest (pull flag is set to False), this parameter is returned by the 5GMSd AF to the 5GMSd Application Provider and indicates the entry point for pushing the content. In case of Pull (pull flag is set to True), and when a protocol is present, this parameter may be provided to the 5GMSd AF to indicate the location from which content is to be pulled. In case of Pull (pull flag is set to True) and when any protocol is not present, this parameter may be provided by the 5GMSd AF to indicate the location from which the content is to be pulled |

Table 4 shows additional example uses of the EgestConfiguration field.

TABLE 4

| Property name | Data Type | Cardinality | Description |
| --- | --- | --- | --- |
| EgestConfiguration | Object | 1 ... 1 | Describes the 5GMSu Application Provider's origin server from which media resources will be ingested via interface M2u. |
| path | String | 1 ... 1 | The relative path which will be used to address the media resources at interface M2u. This path is provided to the 5GMSu AF in the case of Push-based egest. If the content is pulled from 5GMSu AS (pull is set to True), this value is ignored. |
| pull | Boolean | 1 ... 1 | Indicates whether the 5GMSu AS may use Pull or Push for egesting the content. |
| protocol | URI String | 0 ... 1 | A fully-qualified term identifier allocated in the namespace urn: 3gpp:5gms:content-protocol that identifies the content ingest protocol. In the case that the 5GMSu AS is requested not to use any protocols, this field should not be present. If this value is not present, then the value of pull should be set to True. |
| protocolConfiguration | URL String | 0 ... 1 | A URL for the protocol configuration description. The format is defined by the protocol owner. This parameter is used only if the protocol is set to a value outside of the namespace urn: 3gpp. |
| entryPoint | String | 0 ... 1 | An entry point to egest the content. The semantics of the entry point is dependent on the selected ingest protocol. In the case of Pull ingest (pull flag is set to True), this parameter is provided to the 5GMSu AF to the 5GMSu Application Provider and indicates the entry point for pushing the content. In case of Push (pull flag is set to False) and when a protocol is present, the entryPoint may be provided to the 5GMSd AF to indicate the location from which content is to be pushed. In this case, the entryPoint may be used as the base URL. In case of Pull (pull flag is set to True) and when any protocol is not present, the entryPoint may be provided by the 5GMSu AF to indicate the location from which the content is to be pulled |
| entryPointId | String | 0 ... 1 | An entry point identifier to ingest the content. The recipient of this value may map this to the location of the entry point. This value is protocol-dependent. In the case entryPointId exists, this field may be ignored. In the case of Push ingest (pull flag is set to False), this parameter may be provided to 5GMSu AF and indicates the entry point for pushing the content. In case of Pull (pull flag is set to True) and when a protocol is present, this parameter may be provided by 5GMSu AF to indicate the location from which content is to be pulled. |

TABLE 4-continued

| Property name | Data Type | Cardinality | Description |
|---|---|---|---|
| | | | In case of Pull (pull flag is set to True) and when any protocol is not present, this parameter may be provided by the 5GMSu AF to indicate the location from which the content is to be pulled |

Figure 7:
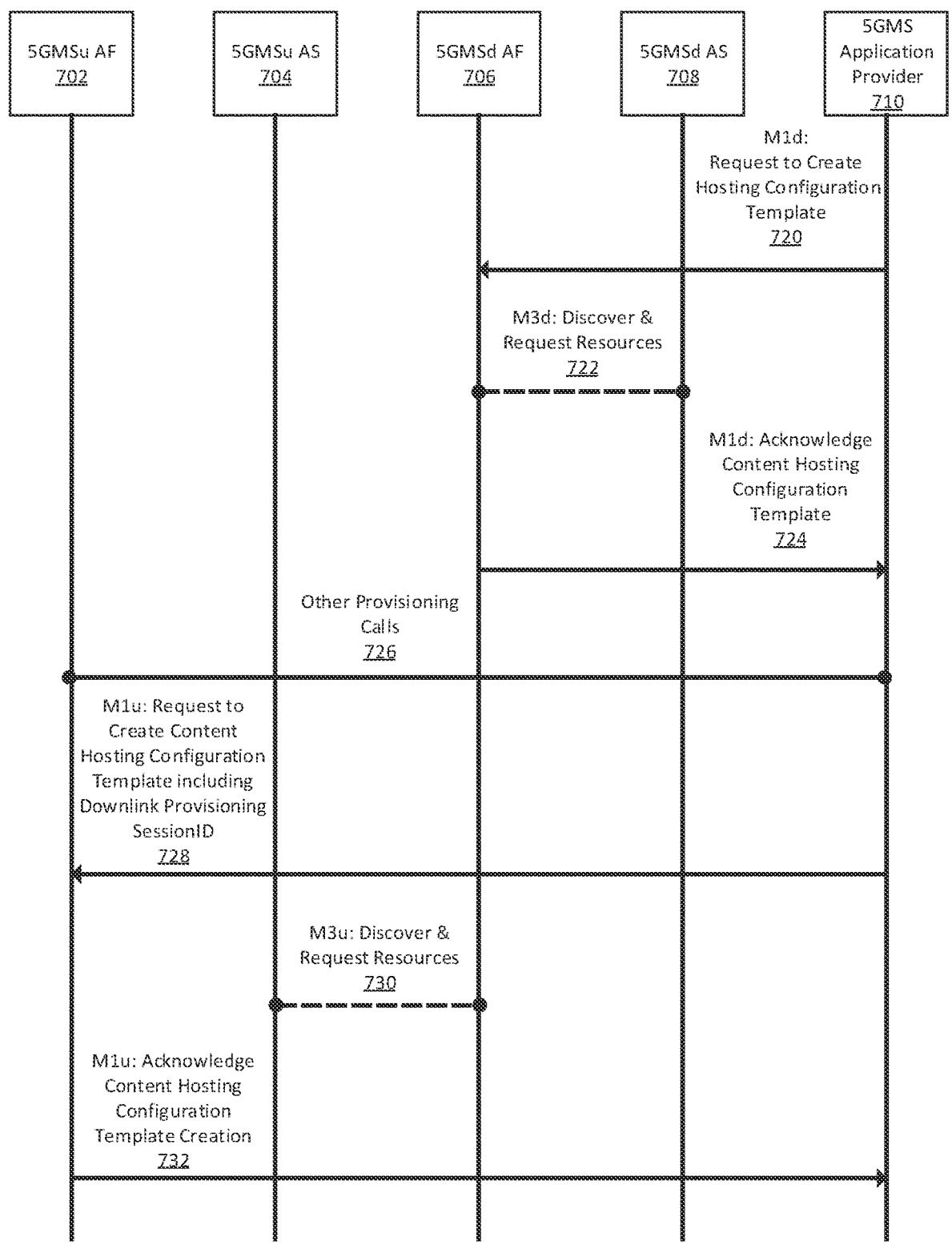
FIG. 7 is a diagram of an operation flow for uplink and downlink streaming in a 5G network, according to embodiments.

FIG. 7 is a diagram of an operation flow for uplink and downlink streaming in a 5G network, according to embodiments. The operation flow utilizes, for example, a 5GMSu AF 702, a 5GMSu AS 704, a 5GMSd AF 706, a 5GMSd AS 708, and a 5GMS Application Provider 710. In one example, since the content hosting configuration template resource has a unique address and it is defined by the provision session ID (provisioningSessionID), the following operations may be used instead of those in FIG. 6.

In operation 720, the 5GMS Application Provider 710 transmits a request to create a hosting configuration template to the 5GMSd AF 706, using, for example, interface M1d. The request may include a request for the 12 address and supported protocols.

In operation 722, the 5GMSd AF 706 requests resources from the 5GMSd AS 708 using, for example, interface M3d.

In operation 724, the 5GMS Application Provider 710 receives an acknowledgement including the content hosting configuration template that is transmitted from the 5GMSd AF 706.

In operation 726, other provisioning calls may be performed.

In operation 728, the 5GMS Application Provider 710 transmits to the 5GMSu AF 702 a request to create a second content hosting configuration template, the request including the downlink provisioningSessionID using, for example, the M1u interface. The 12 address and the supported protocols may be included in the downlink ingest configuration field.

In operation 730, the 5GMSu AF 702 requests resources from and provides the provisioningSessionID to the 5GMSu AS 704 using, for example, the M3u interface.

In operation 732, the 5GMS Application Provider 710 receives an acknowledgement transmitted by the 5GMSu AF 702 that the content hosting configuration template is created.

In FIG. 7, the 5GMSu AF 702 can access the downlink content hosting configuration template using the provisioningSessionID and set up the 5GMSu AS 704 accordingly. Operations 728 and 730 may be performed before operations 720, 722 and 724. In this example, the provisioningSessionID of the uplink is provided in operation 722 to the 5GMSd AF 706.

In FIG. 7, the 12 address and protocols are not exposed to the application service provider, as the internal ingest configuration of the content hosting configuration template source may make it inaccessible to the application service provider. An additional field may be added to the ingest and egest configuration, as shown in Table 5.

TABLE 5

| Property name | Data Type | Cardinality | Description |
|---|---|---|---|
| IngestConfiguration (EgestConfiguration) | Object | 1 . . . 1 | Describes the 5GMSd Application Provider's origin server from which media resources will be ingested via interface M2d. |
| connectingProvisiningId | String | 0 . . . 1 | Describes the provisioningSessionId of 5GMSu(d) to be connected to egest/ingest the content. |

In some examples, only connected AS's IDs are sent and the protocol is negotiated between two AS's, as shown in Table 6.

TABLE 6

| Property name | Data Type | Cardinality | Description |
|---|---|---|---|
| IngestConfiguration (EgestConfiguration) | Object | 1 . . . 1 | Describes the 5GMSd Application Provider's origin server from which media resources will be ingested via interface M2d. |
| connectingASId | String | 0 . . . 1 | Describes the 5GMS AS unique id that the content is ingested (egested). If this value is set, all protocol related fields are ignored and the protocol is negotiated with the connecting AS. |

Figure 8:
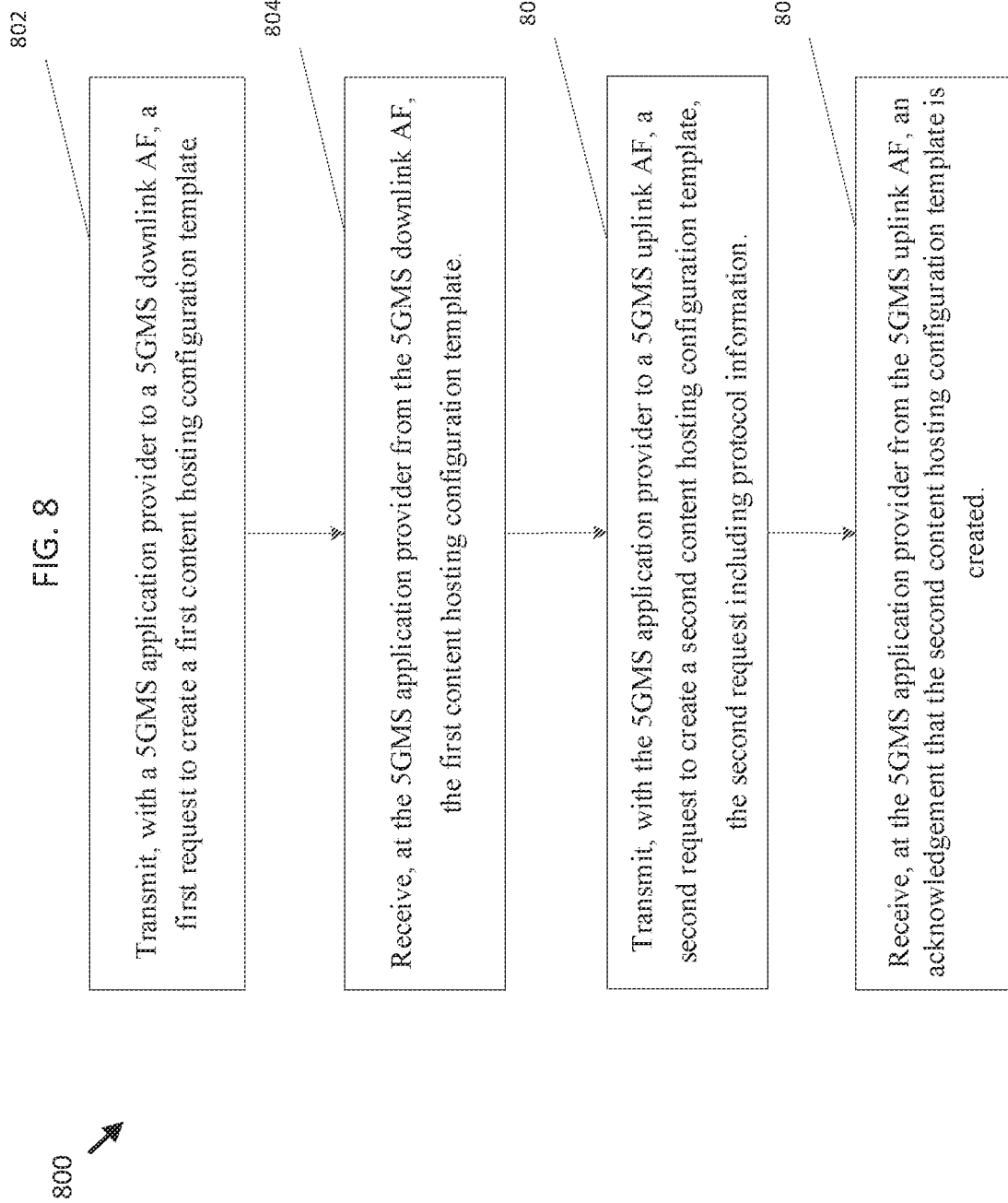
FIG. 8 is a diagram of a process for uplink and downlink streaming, according to embodiments.

FIG. 8 is a diagram of a process 800 for uplink and downlink streaming, according to embodiments. In operation 802, the system transmits, with a 5GMS application provider to a 5GMS downlink AF, a first request to create a first content hosting configuration template. In operation 804, the system receives, at the 5GMS application provider from the 5GMS downlink AF, the first content hosting configuration template. In operation 806, the system transmits, with the 5GMS application provider to a 5GMS uplink AF, a second request to create a second content hosting configuration template, the second request including protocol information. In operation 808, the system receives, at the 5GMS application provider from the 5GMS uplink AF, an acknowledgement that the second content hosting configuration template is created.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Example embodiments may include a method for setting up the uplink to downlink (or vice versa) streaming in a 5G network in which the content is streamed from one user and the is distributed by streaming down to other users, which is possible after content preparation. The uplink and downlink 5G AS's may be set up such that the media is streamed through their direct connection, where a content preparation template and a content hosting configuration template are used to set up this configuration.

The Application Providers may decide how to set up the push or pull protocol and provide the address of the other AS to the pushing/pulling AS through the content hosting configuration template. Various methods of hiding an AS URL address from the Application Provider include encryption or utilizing a unique ID. A URL of its ingest/egest protocol configuration file may be provided by the Application Provider to indicate the protocol and its configuration to the other entity which allows a 5G network provider to have its protocol to connect its AS's.

The Application Provider may provide a downlink provisioning ID to the 5GMSd AF server so that the downlink hosting configuration template is accessed and the 5GMSd AS's configuration is set up accordingly. The Application Provider may exchange one AS's ID with another AS, and negotiations may be left to the two servers to device on the protocol and other connection information.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have." "having," or the like are intended to be open-ended terms. Further, the phrase "based on" is intended to mean "based, at least in part, on" unless explicitly stated otherwise.

What is claimed is:

1. A method, comprising:
    transmitting, with a $5^{th}$ generation media streaming (5GMS) application provider to a 5GMS downlink application function (AF), a first request to create a first content hosting configuration template;
    receiving, at the 5GMS application provider from the 5GMS downlink AF, the first content hosting configuration template;
    transmitting, with the 5GMS application provider to a 5GMS uplink AF, a second request to create a second content hosting configuration template, the second request including protocol information; and
    receiving, at the 5GMS application provider from the 5GMS uplink AF, an acknowledgement that the second content hosting configuration template is created.

2. The method of claim 1, further comprising requesting, with the 5GMS downlink AF from a 5GMS application server, resources based on the first request to create the first content hosting configuration template.

3. The method of claim 1, further comprising requesting, with the 5GMS uplink AF from a 5GMS uplink application server, resources based on the second request to create the second content hosting configuration template and the protocol information.

4. The method of claim 1, wherein the protocol information includes address information.

5. The method of claim 4, wherein the address information includes an encrypted uniform resource locator (URL) address.

6. The method of claim 1, wherein the protocol information includes a downlink provisioning session ID.

7. The method of claim 1, wherein the protocol information includes a uniform resource identifier (URI) string.

8. A device, comprising:
    at least one memory configured to store program code; and at least one processor configured to read the program code and operate as instructed by the program code, the program code including:

first transmitting code configured to cause the at least one processor to transmit, with a $5^{th}$ generation media streaming (5GMS) application provider to a 5GMS downlink application function (AF), a first request to create a first content hosting configuration template;

first receiving code configured to cause the at least one processor to receive, at the 5GMS application provider from the 5GMS downlink AF, the first content hosting configuration template;

second transmitting code configured to cause the at least one processor to transmit, with the 5GMS application provider to a 5GMS uplink AF, a second request to create a second content hosting configuration template, the second request including protocol information; and second receiving code configured to cause the at least one processor to receive, at the 5GMS application provider from the 5GMS uplink AF, an acknowledgement that the second content hosting configuration template is created.

9. The device of claim 8, wherein the program code further includes first requesting code configured to cause the at least one processor to request, with the 5GMS downlink AF from a 5GMS application server, resources based on the first request to create the first content hosting configuration template.

10. The device of claim 8, wherein the program code further includes second requesting code configured to cause the at least one processor to request, with the 5GMS uplink AF from a 5GMS uplink application server, resources based on the second request to create the second content hosting configuration template and the protocol information.

11. The device of claim 8, wherein the protocol information includes address information.

12. The device of claim 11, wherein the address information includes an encrypted uniform resource locator (URL) address.

13. The device of claim 8, wherein the protocol information includes a downlink provisioning session ID.

14. The device of claim 8, wherein the protocol information includes a uniform resource identifier (URI) string.

15. A non-transitory computer-readable medium storing instructions, the instructions comprising: one or more instructions that, when executed by one or more processors of a device, cause the one or more processors to:

transmit, with a $5^{th}$ generation media streaming (5GMS) application provider to a 5GMS downlink application function (AF), a first request to create a first content hosting configuration template, receive, at the 5GMS application provider from the 5GMS downlink AF, the first content hosting configuration template;

transmit, with the 5GMS application provider to a 5GMS uplink AF, a second request to create a second content hosting configuration template, the second request including protocol information; and receive, at the 5GMS application provider from the 5GMS uplink AF, an acknowledgement that the second content hosting configuration template is created.

16. The non-transitory computer-readable medium of claim 15, wherein the instructions, when executed by the one or more processors, further cause the one or more processors to request, with the 5GMS downlink AF from a 5GMS application server, resources based on the first request to create the first content hosting configuration template.

17. The non-transitory computer-readable medium of claim 15, wherein the instructions, when executed by the one or more processors, further cause the one or more processors to request, with the 5GMS uplink AF from a 5GMS uplink application server, resources based on the second request to create the second content hosting configuration template and the protocol information.

18. The non-transitory computer-readable medium of claim 15, wherein the protocol information includes address information.

19. The non-transitory computer-readable medium of claim 18, wherein the address information includes an encrypted uniform resource locator (URL) address.

20. The non-transitory computer-readable medium of claim 15, wherein the protocol information includes a downlink provisioning session ID.

* * * * *